United States Patent
Itou et al.

(10) Patent No.: US 6,752,734 B2
(45) Date of Patent: Jun. 22, 2004

(54) SWITCH VALVE

(75) Inventors: Masahiro Itou, Anjo (JP); Naoyuki Fukaya, Anjo (JP); Mikio Iwase, Anjo (JP); Kazunori Ishikawa, Anjo (JP); Yoshihiro Iijima, Toyota (JP)

(73) Assignees: Aisin AW Co., LTD, Anjo (JP); Toyota Jidosha Kabushiki Kaisha, Toyota (JP)

( * ) Notice: Subject to any disclaimer, the term of this patent is extended or adjusted under 35 U.S.C. 154(b) by 33 days.

(21) Appl. No.: 10/185,004

(22) Filed: Jul. 1, 2002

(65) Prior Publication Data

US 2003/0004026 A1 Jan. 2, 2003

(30) Foreign Application Priority Data

Jul. 2, 2001 (JP) ........................................ 2001-201358

(51) Int. Cl.[7] ........................ F16H 61/18; F16K 11/07; F16K 3/24
(52) U.S. Cl. .................................. 475/116; 137/625.34
(58) Field of Search .......................... 475/31, 116, 127; 137/625.66, 625.69, 625.34, 625.36

(56) References Cited

U.S. PATENT DOCUMENTS

| | | | | |
|---|---|---|---|---|
| 5,088,356 A | * | 2/1992 | Takahashi | 477/127 |
| 5,291,804 A | * | 3/1994 | Kashihara et al. | 475/127 |
| 5,616,094 A | * | 4/1997 | Tsukamoto et al. | 475/128 |
| 5,725,451 A | * | 3/1998 | Tsukamoto et al. | 475/128 |
| 5,816,977 A | * | 10/1998 | Yasue et al. | 477/138 |
| 6,464,610 B1 | * | 10/2002 | Hisano et al. | 475/119 |

FOREIGN PATENT DOCUMENTS

| | | |
|---|---|---|
| JP | 63-210443 | 9/1988 |
| JP | 63-210444 | 9/1988 |
| JP | 02-003727 | 1/1990 |

* cited by examiner

*Primary Examiner*—Ankur Parekh
(74) *Attorney, Agent, or Firm*—Oliff & Berridge, PLC

(57) ABSTRACT

This invention provides a switch valve which can increase durability without causing driver discomfort at a time when a failure occurs. The switch valve has a spool is formed by a spool portion and a plunger which is arranged so as to freely abut against the spool portion. The switch valve also include a spool surrounding portion surrounding the spool and provided with a plurality of land portions. The spool selectively adopts a position at a normal, non-failure state and a position at a fail state. In the position at the normal state, at least one corner portion of the land in the plunger protrudes from an end portion of the corresponding land portion. Because a stepped wear portion is not formed on an inner peripheral surface of the land portion, foreign materials, such as wear powders or the like, do not enter a portion between an outer peripheral surface of the land and the inner peripheral surface of the land portion when the failure occurs.

9 Claims, 9 Drawing Sheets

| SHIFT POSITION | | | SOLENOID VALVE | | | | | | CLUTCH | | | | BREAK | | | OWC | |
|---|---|---|---|---|---|---|---|---|---|---|---|---|---|---|---|---|---|
| | | | S4 | S5 | DSL | SL1 | SL2 | SL3 | C0 | C1 | C2 | C3 | B1 | B2 | B3 | F1 | F2 |
| P | | | × | × | × | ○ | ○ | ○ | × | × | × | × | × | × | ○ | × | × |
| R | | | × | × | × | ○ | ○ | ○ | × | × | ○ | × | × | ○ | ○ | × | × |
| R(INHIBIT) | | | ○ | ○ | × | ○ | ○ | ○ | × | × | × | × | × | × | × | × | × |
| N | | | × | × | × | ○ | ○ | ○ | × | × | × | × | × | × | ○ | × | × |
| D | 1ST | | × | × | × | ○ | ○ | × | × | ○ | × | × | × | × | ○ | ○ | ○ |
| | 2ND | | × | × | × | × | ○ | ○ | × | ○ | × | × | ○ | × | ○ | × | ○ |
| | 3RD | | × | ○ | ◎ | ○ | ◎ | × | ○ | ○ | × | × | × | × | ○ | × | ○ |
| | 4TH | | × | ○ | ◎ | × | ◎ | ○ | ○ | ○ | × | × | ○ | × | ○ | × | ○ |
| | 5TH | | ○ | ○ | ◎ | × | ◎ | ○ | ○ | × | × | ○ | ○ | × | × | × | × |
| 3 | 1ST | | × | × | × | ○ | ○ | × | × | ○ | × | × | × | × | ○ | ○ | ○ |
| | 2ND | | × | × | × | × | ○ | × | × | ○ | × | × | ○ | × | ○ | × | ○ |
| | 3RD | | × | ○ | ◎ | ○ | ◎ | × | ○ | ○ | × | × | × | × | ○ | × | ○ |
| 2 | 1ST | | × | × | ○ | ○ | ○ | × | × | ○ | × | × | × | ○ | ○ | ○ | ○ |
| | 2ND | | × | × | × | × | ○ | × | × | ○ | × | × | ○ | × | ○ | × | ○ |
| D, 3 / 2 | TRANSMISSION SPEED RANGE AT A TIME WHEN ALL SOLENOIDS ARE OFF | APPROXIMATE 4TH | × | × | × | × | × | × | ○ | ○ | × | ○ | × | × | × | × | × |
| | | 3RD | × | × | × | × | × | × | ○ | ○ | × | × | × | × | ○ | × | ○ |
| REMARKS | | ○ | | ON | | | | | | ENGAGEMENT | | | | | | | LOCK | |
| | | × | | OFF | | | | | | RELEASE | | | | | | | FREE | |
| | | ◎ | ON:LOCK-UP ON OFF:LOCK-UP OFF | | | | | | — | | | | — | | | | | |

Fig. 4

SWITCH VALVE

BACKGROUND OF THE INVENTION

1. Field of the Invention

The invention relates to a switch valve.

2. Description of the Related Art

Conventionally, an automatic transmission used in a vehicle such as an automobile or the like has a variable speed gear provided with a planetary gear unit and the like. The variable speed gear is typically provided with a plurality of frictional engagement elements such as a clutch, a brake and the like. Further, the automatic transmission used in a vehicle is structured so as to selectively output a rotation from gear elements such as a sun gear, a ring gear, a carrier and the like in the planetary gear unit to achieve a plurality of shifting speeds by engaging and disengaging each of the frictional engagement elements in accordance with a predetermined combination.

Each of the frictional engagement elements is engaged and disengaged by operating a hydraulic servo in a hydraulic circuit. The hydraulic servo is provided with a hydraulic servo drum having an outer peripheral wall and an inner peripheral wall, and an annular piston slidably fitted within the hydraulic servo drum and the like. The hydraulic servo is structured so as to move the annular piston by supplying and discharging an oil with respect to an apply oil chamber formed between the hydraulic servo drum and the annular piston, thus engaging and disengaging the frictional engagement elements arranged in such a manner as to oppose to the annular piston.

Further, various kinds of solenoid valves, switch valves and the like are arranged in the hydraulic circuit. A predetermined switch valve is switched by turning on and off a solenoid of a predetermined solenoid valve. A hydraulic pressure is supplied to and discharged from the hydraulic servo connected to the switch valve.

For the automatic transmission having the structure disclosed above, in the case where it is intended to achieve a certain shifting speed, the structure is made such that one or more predetermined frictional engagement elements are engaged. However, when a failure or an abnormality occurs in the solenoid valve and the frictional engagement element (which is not required to be engaged) is engaged, an interlock is generated in the variable speed gear.

Accordingly, as disclosed in Japanese Patent Nos. 2689421, 2715420 and 2917272, a hydraulic circuit structured is provided in which when the hydraulic pressure is going to be supplied to the hydraulic servo in the frictional engagement element (which is not required to be engaged), a predetermined switch valve is switched by the hydraulic pressure so as to prevent the hydraulic pressure from being supplied to the hydraulic servo and prevent the interlock from being generated in the variable speed gear.

In this case, the switch valve is provided with a cylinder chamber formed in a valve body, and a spool arranged within the cylinder chamber so as to freely move forward and backward. A plurality of lands are also formed in the spool. Further, in a structure in which a diameter of a predetermined land is made different from a diameter of another land, a sleeve is arranged within the cylinder chamber and the structure is made such that the predetermined land moves forward and backward along the sleeve. In this case, when each of axes in the spool, the cylinder chamber and the sleeve is shifted, there is a risk that a failure in sliding is generated between the spool and the valve body. Therefore, the structure is made such that the spool is separated into a plunger provided with a land moved forward and backward along the sleeve, and a spool portion provided with another land.

FIG. 2 is a cross sectional view showing a main portion of a conventional switch valve.

In FIG. 2, reference numeral 150 denotes a switch valve, reference numeral 151 denotes a valve body, reference numeral 152 denotes a cylinder chamber formed in the valve body 151, and reference numeral 153 denotes a spool arranged within the cylinder chamber 152 so as to freely move forward and backward. The spool 153 is provided with a plunger 155 having a land 154, and a spool portion 156 arranged so as to freely abut against the plunger 155 and having a plurality of lands (not shown). The land 154 and another land (not shown) are formed so that their diameters are made different from each other. In this configuration, an area in which the land 154 is exposed to the hydraulic pressure and an area in which another land is exposed to the hydraulic pressure are different from each other.

A sleeve 161 is fitted and inserted within the cylinder chamber 152. The sleeve 161 is prevented from coming off by a sleeve retainer 162. A signal oil chamber 165 is formed between the plunger 155 and the sleeve 161. Further, an input port 166 is formed in the signal oil chamber 165. A control hydraulic pressure is supplied via the input port 166.

The plunger 155 moves forward and backward along the sleeve 161, while an outer peripheral surface of the land 154 and an inner peripheral surface of a land portion g in the sleeve 161 move in a sliding motion. Further, the spool portion 156 moves forward and backward along the cylinder chamber 152, while an outer peripheral surface of said another land and an inner peripheral surface of the land portion in the valve body 151 move in a sliding motion.

In a normal non-failure state, the switch valve 150 adopts a left half position. However, when a failure occurs, the switch valve 150 adopts a right half position. At this time, a predetermined hydraulic pressure is prevented from being supplied to the hydraulic servo to prevent the frictional engagement element from being engaged.

However, the conventional switch valve 150 is configured to prevent the interlock from being generated in the variable speed gear. The switch valve 150 is thus operated only when failure occurs. The switch valve 150 is not operated and is placed at a predetermined position at the normal, non-failure state.

Accordingly, during engine operation, the vibration generated by a pulsation of the hydraulic pressure or the like in the hydraulic circuit is transmitted to the plunger 155. This condition causes fretting, i.e., vibration without slide motions, to be generated in the plunger 155 at the predetermined position. In this configuration a stepped wear portion 167 formed along a shape of a corner portion of the land 154 is formed on the inner peripheral surface of the land portion g. When foreign materials 168 such as wear powders or the like, accumulate in the stepped wear portion 167 and enter a portion between the land 154 and the sleeve 161 when failure occurs, it is difficult or almost impossible to smoothly move the plunger 155, causing driver discomfort.

Further, because the outer peripheral surface of the plunger 155 and the inner peripheral surface of the land portion g are scratched by the foreign materials 168, and durability of the switch valve 150 is decreased.

SUMMARY OF THE INVENTION

It is an objective of the invention to solve the problems in the conventional switch valve by providing a switch valve which can increase durability without causing driver discomfort when a failure occurs.

To accomplish the above objective in various exemplary embodiments according to this invention, a switch valve is provided with a spool having a spool portion arranged so as to freely move forward and backward. The switch valve further includes at least one land and a plunger arranged so as to freely abut against the spool portion. The plunger is also provided with a land. The switch valve further includes a spool surrounding portion surrounding the spool. The spool surrounding portion also includes a plurality of land portions corresponding to the respective lands.

In the above configuration the spool selectively adopts a position at a normal state and a position at a fail state. Further, in the position at the normal state, at least one corner portion of the land in the plunger protrudes from an end portion of the corresponding land portion.

In this case, at the position at the normal non-failure state, at least one corner portion in the land of the plunger protrudes from the end portion of the corresponding land portion.

Accordingly, because the stepped wear portion is not formed on the inner peripheral surface of the land portion, foreign materials, such as the wear powders or the like, do not enter the portion between the outer peripheral surface of the land and the inner peripheral surface of the land portion at a time when the failure occurs. As a result, it is possible to smoothly move the plunger without causing driver discomfort.

Further, because the outer peripheral surface of the land and the inner peripheral surface of the land portion are not scratched by the foreign materials, it is possible to increase durability of the switch valve.

In another exemplary embodiment, the switch valve of this invention includes a spool surrounding portion made by a cylinder chamber formed in a valve body.

In yet another exemplary embodiment, the switch valve of this invention includes a spool surrounding portion made by a cylinder chamber and a sleeve arranged in the cylinder chamber.

BRIEF DESCRIPTION OF THE DRAWINGS

FIG. 4 shows an operation table of the automatic transmission in the embodiment according to this invention;

DESCRIPTION OF THE PREFERRED EMBODIMENT

Embodiments of the invention will be described with reference to the accompanying drawings.

Figure 3:
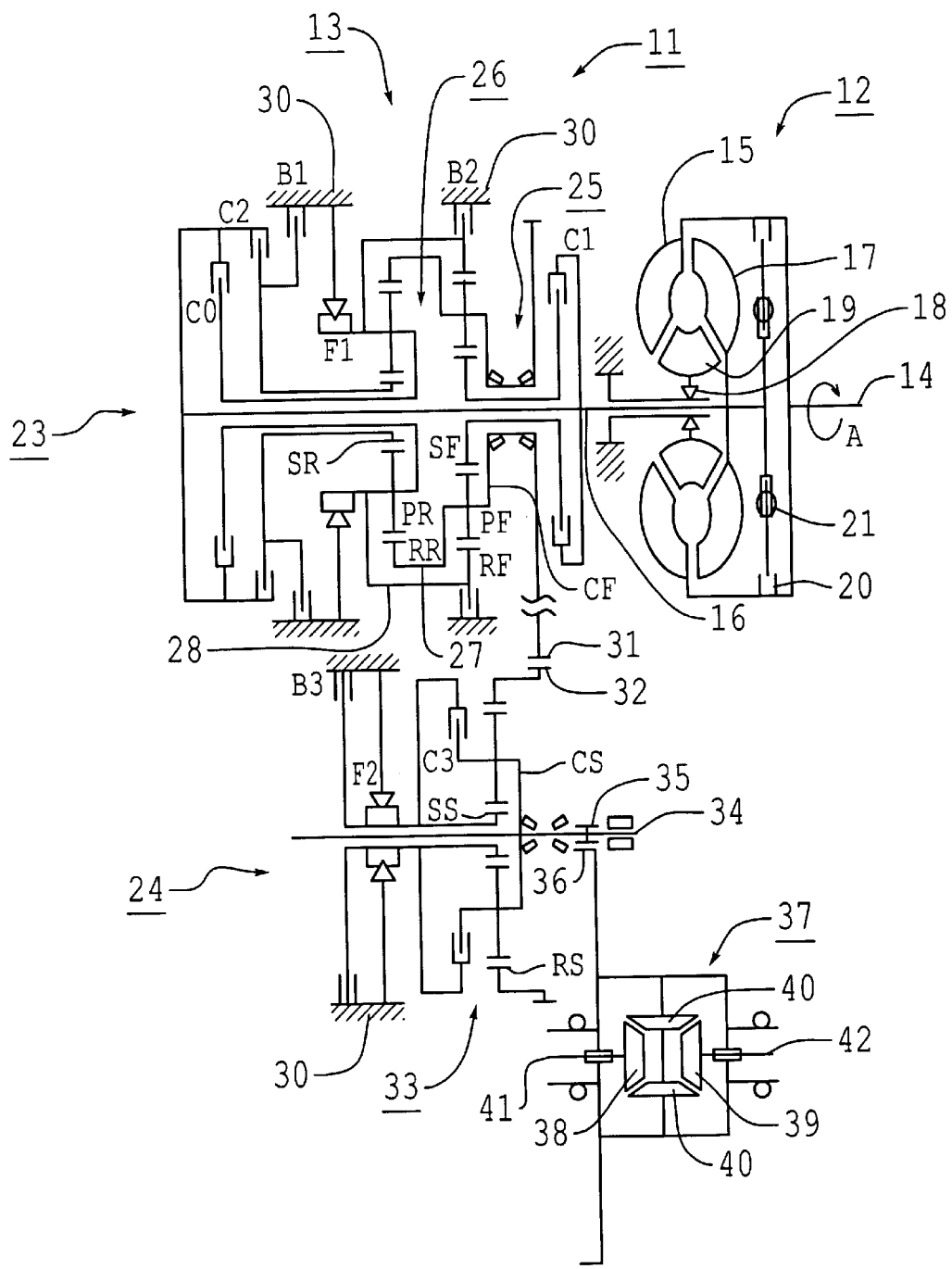
FIG. 3 is a diagram of an automatic transmission in the embodiment according to this invention.

FIG. 3 shows a diagram of an automatic transmission in the embodiment according to this invention. FIG. 4 shows an operation table of the automatic transmission in the embodiment according to this invention.

In FIG. 3, reference numeral 11 denotes an automatic transmission. The automatic transmission 11 includes a front planetary gear unit 25, a rear planetary gear unit 26, and a planetary gear unit 33, all which serve as a gear element. The automatic transmission also includes a first clutch C1, a second clutch C2, a third clutch C3, a fourth clutch C0, a first brake B1, a second brake B2 and a third brake B3, all which serve as a frictional engagement element. A power transmitting state is formed in a variable speed gear 13 by engaging and disengaging a predetermined frictional engagement element.

Reference numeral 12 denotes a torque converter which transmits a rotation in a direction of an arrow A generated by driving an engine (not shown) to the automatic transmission 11. Reference numeral 13 denotes a variable speed gear changing a speed of the rotation transmitted from the torque converter 12 so as to output it. The torque converter 12 includes at least a pump impeller 15 connected to an output shaft 14 to which the rotation of the engine is output, a turbine runner 17 connected to an input shaft 16 which inputs the rotation to the variable speed gear 13, a stator 19 mounted onto an one way clutch 18, a lockup clutch 20 which is locked at a time when a predetermined condition is established and connects between the output shaft 14 and the input shaft 16, and a damper 21.

The variable speed gear 13 includes a main transmission 23 and a sub transmission 24. The main transmission 23 has a front planetary gear unit 25 and a rear planetary gear unit 26. The front planetary gear unit 25 includes a sun gear SF, a ring gear RF concentrically arranged with the sun gear SF, a pinion PF meshed with the sun gear SF and the ring gear RF, and a carrier CF rotatably supporting the pinion PF. The rear planetary gear unit 26 includes a sun gear SR, a ring gear RR concentrically arranged with the sun gear SR, a pinion PR meshed with the sun gear SR and the ring gear RR, and a carrier CR rotatably supporting the pinion PR.

The carrier CF and the ring gear RR are coupled together by a connecting element 27. The carrier CR and the ring gear RF are coupled together by a connecting element 28. Further, the sun gear SF and the input shaft 16 are coupled together via the first clutch C1. The ring gear RF and an automatic transmission case 30 are selectively coupled together via the second brake B2 and a first one-way clutch F1 arranged in parallel to each other, respectively.

Further, the carrier CF and a counter drive gear 31 are coupled together. The sun gear SR and the input shaft 16 are coupled together via the second clutch C2. The sun gear SR and the automatic transmission case 30 are coupled via the first brake B1. The carrier CR and the input shaft 16 are coupled together via the fourth clutch C0. The carrier CR and the automatic transmission case 30 are selectively coupled via the second brake B2 and the first one-way clutch F1 arranged in parallel to each other, respectively.

Further, the sub transmission 24 has a planetary gear unit 33, a sun gear SS, a ring gear RS concentrically arranged with the sun gear SS, a pinion PS meshed with the sun gear SS and the ring gear RS, and a carrier CS rotatably supporting the pinion PS. The sun gear SS and the automatic transmission case 30 are selectively coupled together via the third brake B3 and a second one-way clutch F2 arranged in parallel to each other. The sun gear SS and the carrier CS are coupled together via the third clutch C3, respectively.

Further, the ring gear RS and a counter driven gear 32 are also coupled together.

The switch valve structure is made such that the counter drive gear 31 and the counter driven gear 32 are meshed with each other so as to transmit a rotation of the main transmission 23 to the sub transmission 24. Further, the carrier CS and a counter shaft 34 are coupled together, and an output gear 35 fixed to the counter shaft 34 and a large ring gear 36 of a differential unit 37 are meshed. The differential unit 37 has left and right side gears 38 and 39, and a pinion 40 meshed with each of the side gears 38 and 39. The differential unit 37 distributes the rotation transmitted via the large ring gear 36 so as to transmit it to drive shafts 41 and 42.

The first one-way clutch F1 becomes free in the case where an outer race (not shown) is fixed to the automatic transmission case 30 and an inner race (not shown) is going to rotate in the same direction (a forward direction) as a direction of an arrow A together with the carrier CR. The first one-way ditch F1 is locked in the case where the inner race is going to rotate in an opposite direction (a backward direction) to the direction of the arrow A. Further, the second one-way clutch F2 is locked in the case where the outer race (not shown) is fixed to the automatic transmission case 30 and the inner race (not shown) is going to rotate in the forward direction together with the sun gear SS. The second one-way clutch F2 becomes free in the case where the inner race is going to rotate in the backward direction.

The operation of the automatic transmission 11 having the structure mentioned above will next be explained in detail.

In FIG. 4, reference symbols SL1 to SL3 denote a normal open type first to third solenoid valve, respectively, reference symbols S4 and S5 denote a normal close type fourth and fifth solenoid valves, respectively, reference symbol DSL denotes a normal close type sixth solenoid valve, reference symbol C1 denotes a first clutch, reference symbol C2 denotes a second clutch, reference symbol C3 denotes a third clutch, reference symbol C0 denotes a fourth clutch, reference symbol B1 denotes a first brake, reference symbol B2 denotes a second brake, reference symbol B3 denotes a third brake, reference symbol F1 denotes a first one-way clutch (OWC), and reference symbol F2 denotes a second one-way clutch.

Further, in a shift position, reference symbol P denotes a parking range, reference symbol R denotes a reverse movement range, reference numeral N denotes a neutral range, reference numeral D denotes a forward movement range, reference numeral 3 denotes a third range, reference numeral 2 denotes a second range, reference symbol 1st denotes a first speed, reference symbol 2nd denotes a second speed, reference symbol 3rd denotes a third speed, reference symbol 4th denotes a fourth speed, and reference symbol 5th denotes a fifth speed.

Further, reference symbol "O" denotes an "on" state in the first to sixth solenoid valves SL1 to SL3, S4, S5 and $D_{SL}$; denotes an engaged state in the first clutch C1, the second clutch C2, the third clutch C3, the fourth clutch C0, the first brake B1, the second brake B2 and the third brake B3; and denotes a locked state in the first and second one-way clutch F1 and F2. Further, reference symbol "x" denotes an off state in the first to sixth solenoid valves SL1 to SL3, S4, S5 and $D_{SL}$; denotes a released state in the first clutch C1, the second clutch C2, the third clutch C3, the fourth clutch C0, the first brake B1, the second brake B2 and the third brake B3; and denotes a free state in the first and second one-way clutches F1 and F2. Further, reference symbol "⊙" denotes that the lock-up clutch 20 (shown in FIG. 3) becomes "on" at a time of being engaged (lock-up on), and the lock-up clutch 20 becomes "off" at a time of being released (lock-up off).

In the first speed of the forward movement range, the first clutch C1 and the third brake B3 are engaged. In this case, in the main transmission 23, the engine rotation (the rotation in the forward direction) transmitted to the input shaft 16 is transmitted to the sun gear SF via the first clutch C1. Because the sun gear SF and the pinion PF are meshed, the sun gear SF is going to rotate the carrier CF in the forward direction. However, because the carrier CF is connected to the drive shafts 41 and 42 via the counter drive gear 31 and the sub transmission 24, the carrier CF generates a reaction force. As a result, the ring gear RF is going to rotate in the reverse direction. However, because the ring gear RF is connected to the first one-way clutch F1 via the connecting element 28, the rotation in the reverse direction is prevented. As a result, a rotation in the forward direction at a reduced speed is outputted from the carrier CF. This rotation is transmitted to the sub transmission 24 via the counter drive gear 31.

In the sub transmission 24, along with the reverse rotation of the counter driven gear 32 due to the rotation of the counter drive gear 31, the ring gear RS is also rotated in the reverse direction. As a result, the sun gear SS is going to rotate in the forward direction in accordance with the rotation of the ring gear RS. However, because the sun gear SS is connected to the second one-way clutch F2, the rotation in the forward direction is prevented. As a result, the sub transmission 24 is placed in an under drive condition. The first speed rotation in the forward direction outputted from the carrier CS is then transmitted to the differential unit 37 via the output gear 35.

In the second speed of the second range, the first clutch C1, the first brake B1 and the third brake B3 are engaged. In this case, in the main transmission 23, the sun gear SR is fixed in accordance with the engagement of the first brake B1. As a result, a rotation at a reduced speed is outputted from the carrier CF and is then transmitted to the sub transmission 24 via the counter drive gear 31.

The sub transmission 24 is then placed in the under drive state. The second speed rotation in the forward direction is outputted from the carrier CS and is then transmitted to the differential unit 37 via the output gear 35.

In the third speed of the forward movement range, the first clutch C1, the fourth clutch C0 and the third brake B3 are engaged. In this case, in the main transmission 23, the front planetary gear unit 25 and the rear planetary gear unit 26 lock-up, in accordance with the engagement between the first clutch C1 and the fourth clutch C0. A rotation in the forward direction at a speed of rotation which is equal to a speed of rotation of the engine is outputted by the carrier CF. This rotation is transmitted to the sub transmission 24 via the counter drive gear 31.

The sub transmission 24 is then placed in the under drive state, and the third speed rotation in the forward direction is outputted from the carrier CS. The third speed rotation is next transmitted to the differential unit 37 via the output gear 35.

In the fourth speed of the forward movement range, the fourth clutch C0, the first brake B1 and the third brake B3 are engaged. In this case, because the sun gear SR is fixed and the rotation in the forward direction with a number of rotations equal to the number of rotations of the engine is transmitted to the carrier CR via the fourth clutch C0, an accelerated rotation is outputted from the ring gear RR and the carrier CF. This accelerated rotation is transmitted to the sub transmission 24 via the counter drive gear 31.

The sub transmission 24 is then placed in the under drive state and the fourth speed rotation in the forward direction is outputted from the carrier CS. The fourth speed rotation is next transmitted to the differential unit 37 via the output gear 35.

In the fifth speed of the forward movement range, the third clutch C3, the fourth clutch C0 and the first brake B1 are engaged. In this case, in the main transmission 23, because the sun gear SR is fixed and the rotation in the forward direction with a number of rotations equal to the number of rotations of the engine is transmitted to the carrier CR via the fourth clutch C0, the accelerated rotation is outputted by the ring gear RR and the carrier CF. This accelerated rotation is transmitted to the sub transmission 24 via the counter drive gear 31.

As the planetary gear unit 33 is placed in the lock-up state due to the engagement of the third clutch C3, the sub transmission 24 is also placed in the lock-up state. A fifth speed rotation in the forward direction outputted from the carrier CS is then transmitted to the differential unit 37 via the output gear 35. In this case, in the embodiment, the sub transmission 24 is structured so as to be switched from the under drive state to the lock-up state in accordance with the engagement of the third clutch C3. However, the structure may be made such that the speed is increased from the lock-up state so as to be further switched to an overdrive state in accordance with the engagement of the third clutch C3.

A hydraulic circuit will now be explained.

Figure 5:
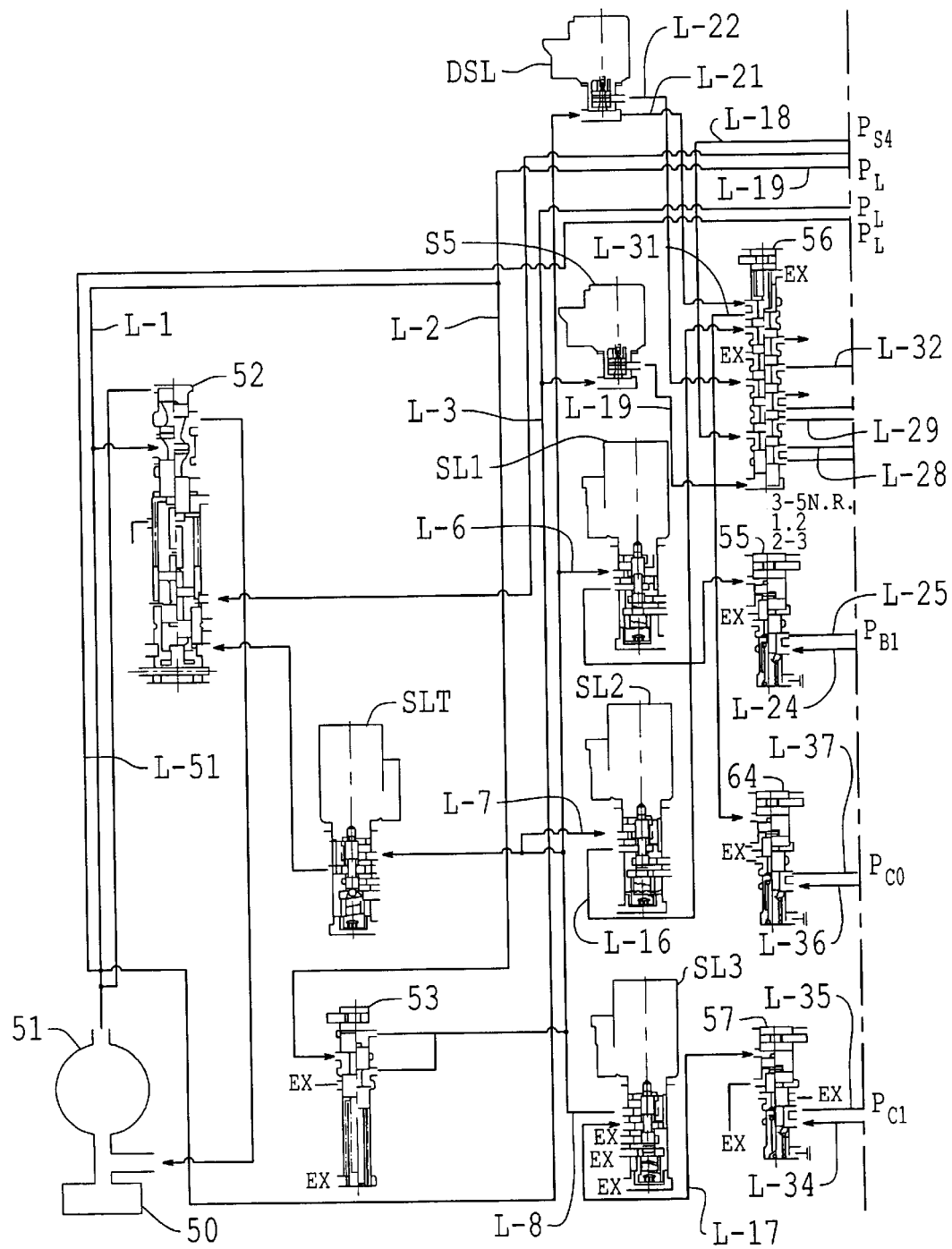
FIG. 5 is a left half view showing a hydraulic circuit in the embodiment according to this invention.
Figure 6:
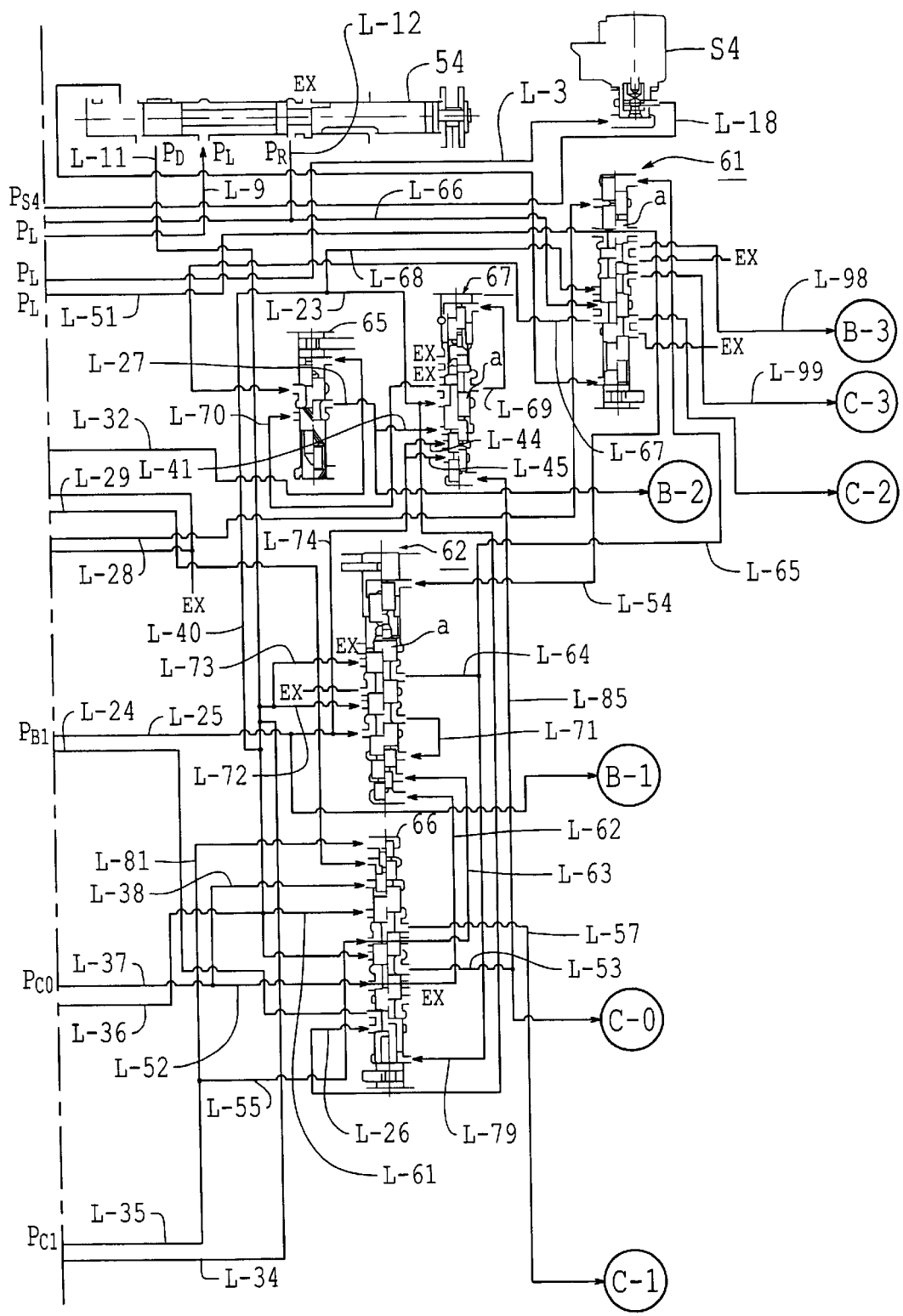
FIG. 6 is a right half view showing the hydraulic circuit in the embodiment according to this invention.
Figure 7:
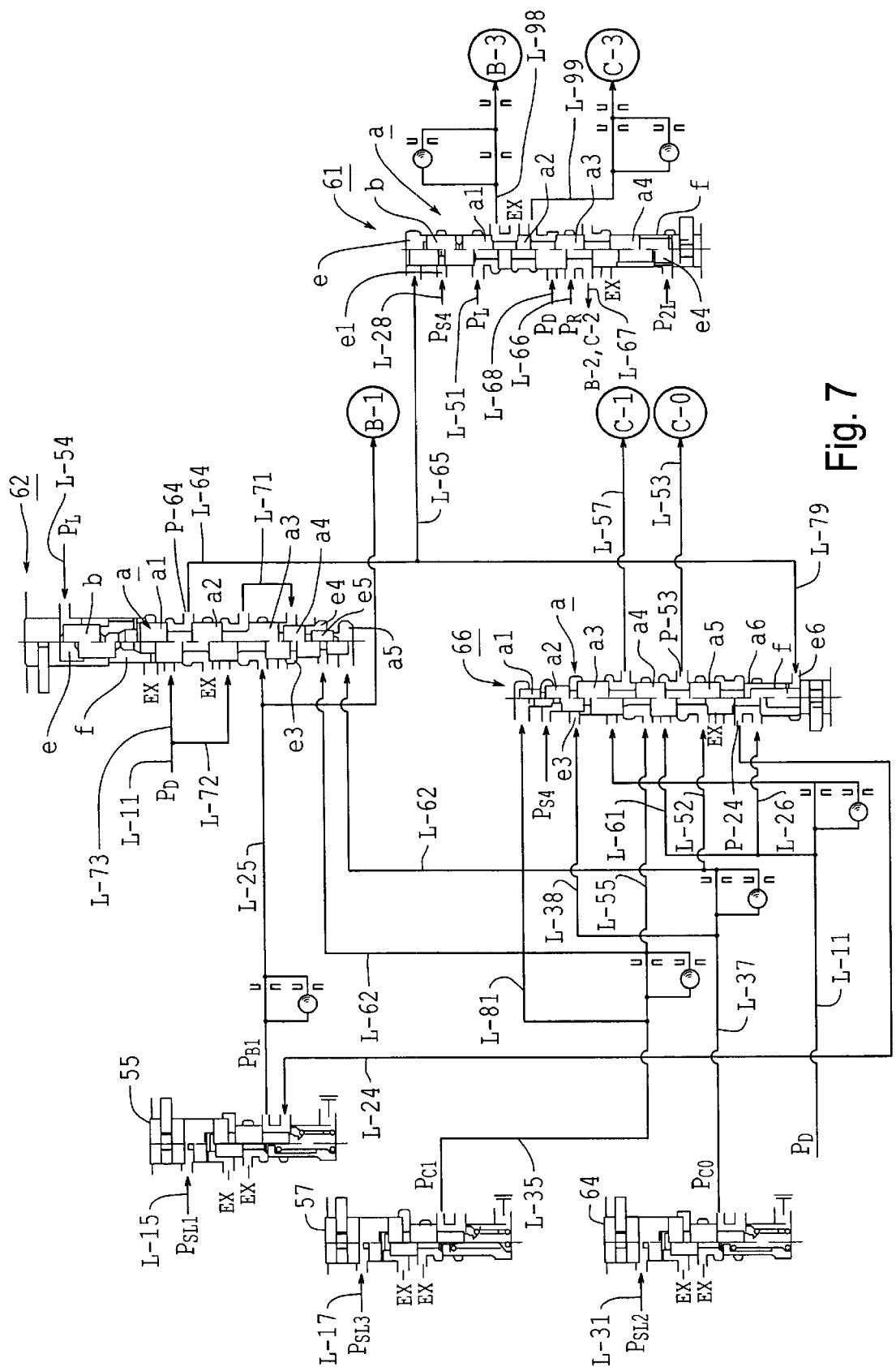
FIG. 7 is a view showing a main portion of the hydraulic circuit in the embodiment according to this invention.

FIG. 5 is a left half view showing the hydraulic circuit in the embodiment according to this invention. FIG. 6 is a right half view showing the hydraulic circuit in the embodiment according to this invention. FIG. 7 shows a main portion of the hydraulic circuit in the embodiment according to this present invention.

In the drawings, reference symbols C-1, C-2, C-3, C-0, B-1, B-2 and B-3 denote hydraulic servos which respectively engage and disengage the first clutch C1 (shown in FIG. 3), the second clutch C2, the third clutch C3, the fourth clutch C0, the first brake B1, the second brake B2 and the third brake B3 in accordance with the supply and discharge of the hydraulic pressure. When a shifting speed to be achieved is selected by gear shift processing means of a control unit (not shown), a predetermined hydraulic servo is selected among the hydraulic servos C-1, C-2, C-3, C-0, B-1, B-2 and B-3 in correspondence to the shifting speed. A predetermined hydraulic pressure for application is then supplied to the selected hydraulic servo.

Further in the drawings, reference numeral 50 denotes a strainer, reference numeral 51 denotes an oil pump which sucks and discharges an oil in an oil tank (not shown) via the strainer 50, and reference numeral 52 denotes a primary regulator valve. The primary regulator valve 52 regulates the hydraulic pressure within an oil passage L-1 to generate a predetermined line pressure PL. The line pressure PL is supplied to a solenoid modulator valve 53 via an oil passage L-2. The solenoid modulator valve 53 regulates the line pressure $P_L$ to generate the solenoid modulator pressure.

The line pressure PL generated by the primary regulator valve 52 is supplied to the fourth solenoid valve S4 via the oil passages L-1 and L-3. The line pressure $P_L$ is also supplied to the fifth solenoid valve S5 via the oil passage L-1, L-3 and L-4. Further, the solenoid modulator pressure, generated by the solenoid modulator valve 53, is supplied to the sixth solenoid valve $D_{SL}$ via an oil passage L-5, to the first solenoid valve SL1 via an oil passage L-6, to the second solenoid valve $S_{L2}$ via an oil passage L-7, to the third solenoid valve SL3 via an oil passage L-8, and also to a seventh solenoid valve $S_{LT}$ via an oil passage L-7a.

In this case, because the first, second and third solenoid valves SL1–SL3 and the seventh solenoid valve $S_{LT}$ correspond to solenoid valves of normal open type, a signal hydraulic pressure is not generated at a time when each of the solenoids is turned on (energized). However, the signal hydraulic pressure is generated at a time when each of the solenoids is turned off (not energized). Further, since the fourth, fifth and sixth solenoids S4, S5 and $D_{SL}$ correspond to solenoid valves of normal close type, the signal hydraulic pressure is generated at a time when each of the solenoids is turned on. However, the signal hydraulic pressure is not generated at a time when each of the solenoids is turned off.

Further, the line pressure PL is supplied to a manual valve 54 corresponding to hydraulic pressure switching and generating means via the oil passages L-1 and L-9. When the forward movement range is selected, the manual valve 54, which is switched by operating a speed selecting device such as a shift lever, a switch or the like (not shown), generates a D range pressure $P_D$ in an oil passage L-1. When the reverse movement range is selected, and the manual valve 54 generates an R range pressure PR in an oil passage L-12.

The first solenoid valve SL1, which receives a first solenoid signal $S_{G1}$ from the control unit, regulates a solenoid modulator pressure supplied from the solenoid modulator valve 53. The first solenoid valve SL1 also generates a signal hydraulic pressure $P_{SL1}$ and supplies the signal hydraulic pressure $P_{SL1}$ to a B-1 control valve 55 via an oil passage L-15.

The second solenoid valve SL2, which receives a second solenoid signal $S_{G2}$ from the control unit, regulates the solenoid modulator pressure supplied from the solenoid modulator valve 53. The second solenoid valve SL2 generates a signal hydraulic pressure $P_{SL2}$ and supplies the signal hydraulic pressure $P_{SL2}$ to a solenoid relay valve 56 via an oil passage L-16.

The third solenoid valve SL3, which receives a third solenoid signal SG3 from the control unit, regulates the solenoid modulator pressure supplied from the solenoid modulator valve 53. The third solenoid valve SL3 generates a signal hydraulic pressure $P_{SL3}$ and supplies that signal to a C-1 control valve 57 via an oil passage L-17.

Further, the fourth solenoid valve S4, which receives a fourth solenoid signal SG4 from the control unit so as to turn on and off the solenoid, generates a signal hydraulic pressure $P_{S4}$ at a time when the solenoid is in an on state and then supplies that signal to the solenoid relay valve 56 via an oil passage L-18. The fifth solenoid valve S5, which receives a fifth solenoid signal SG5 from the control unit so as to turn on and off the solenoid, generates a signal hydraulic pressure $P_{S5}$ at a time when the solenoid is in an on state and then supplies that signal to the solenoid relay valve 56 via an oil passage L-19. The sixth solenoid valve DSL which receives a sixth solenoid signal SG6 from the control unit, regulates the solenoid modulator pressure supplied from the solenoid modulator valve 53. The sixth solenoid valve DSL generates a signal hydraulic pressure $P_{DSL}$ and supplies that signal to the solenoid relay valve 56 via an oil passage L-22.

The solenoid relay valve 56, which is switched by the signal hydraulic pressure $P_{S5}$ supplied via the oil passage L-19, adopts a left half position in the third speed or higher and communicates between the oil passages L-21 and L-31 and between the oil passages L-18 and L-28. The solenoid relay valve 56 supplies the solenoid modulator pressure supplied via the oil passages L-5 and L-21 to a C-0 control valve 64 via the oil passage L-31. Valve 56 also supplies the signal hydraulic pressure $P_{S4}$ supplied via the oil passages L-3 and L-18 to a fourth-to-fifth shift valve 61 corresponding to change gear ratio switching means and a second switch valve via an oil passage L-28, respectively.

Further, the solenoid relay valve 56 adopts a right half position in the second speed or lower and during a second-to-third shift and communicates between the oil passages L-16 and L-31, between the oil passages L-22 and L-32 and between the oil passages L-18 and L-29. Valve 56 supplies the signal hydraulic pressure $P_{SL2}$ supplied via the oil passage L-16 to the C-0 control valve 64 via the oil passage L-31, supplies the signal hydraulic pressure $P_{DSL}$ supplied via the oil passage L-22 to a B-2 control valve 65 via the oil passage L-32. Valve 56 also supplies the signal hydraulic pressure $P_{S4}$ supplied via the oil passage L-18 to a clutch apply control valve 66 corresponding to interlock generation preventing means, neutral state formation preventing means and a first switch valve via an oil passage L-29.

In this case, the second and sixth solenoid valves SL2 and DSL are used for performing a lock-up control of the torque converter 12 in the third speed or higher. Accordingly, when the solenoid relay valve 56 adopts the left half position in the third speed or higher, the signal hydraulic pressure $P_{SL2}$ supplied via the oil passage L-16 is supplied to a lock-up control valve (not shown), and the signal hydraulic pressure $P_{DSL}$ supplied via the oil passage L-22 is supplied to a lock-up relay valve (not shown).

First hydraulic pressure supplying means includes at least one of the first solenoid valve SL1 and the B-1 control valve 55. Second hydraulic pressure supplying means includes at least one of the second solenoid valve SL2, the solenoid relay valve 56 and the C-0 control valve 64. Third hydraulic pressure supplying means includes by at least one of the third solenoid valve SL3 and the C-1 control valve 57. Further, a control valve includes the B-1 control valve 55, the C-1 control valve 57 and the C-0 control valve 64.

The B-1 control valve 55, supplied with the signal hydraulic pressure $P_{SL1}$ via the oil passage L-15, regulates a D range pressure $P_D$ supplied via the oil passages L-11, L-40, L-23 and L-26, the clutch apply control valve 66 and the oil passage L-24. Control valve 55 generates a B-1 control pressure $P_{B1}$ and supplies the B-1 control pressure $P_{B1}$ to a B-1 apply control valve 62 corresponding to fail detecting means and a fail detecting valve via an oil passage L-25.

Further, the C-1 control valve 57 supplied with the signal hydraulic pressure $P_{SL3}$ via the oil passage L-17, regulates the D range pressure $P_D$ supplied via the oil passages L-11 and L-34. Control valve 57 generates a C-1 control pressure $P_{C1}$, supplies the C-1 control pressure $P_{C1}$ to the clutch apply control valve 66 via oil passages L-35 and L-81 and the oil passages L-35 and L-55, and supplies the C-1 control pressure $P_{C1}$ to the B-1 apply control valve 62 via the oil passages L-35 and L-63. Further, the C-0 control valve 64, supplied with the signal hydraulic pressure $P_{SL2}$ via the oil passage L-31, regulates the D range pressure $P_D$ supplied via the oil passages L-11 and L-36. The control valve 64 generates a C-0 control pressure $P_{C0}$, supplies the C-0 control pressure $P_{C0}$ to the clutch apply control valve 66 via oil passages L-37 and L38 and the oil passages L-37 and L-52, and supplies the C-0 control pressure $P_{C0}$ to the B-1 apply control valve 62 via the oil passages L-37 and L-62 and also via an oil passage L-52 (as shown in FIG. 6). In this case, a first controlling hydraulic pressure includes the C-1 control pressure $P_{C1}$, a second controlling hydraulic pressure includes the C-0 control pressure $P_{C0}$, and a third controlling hydraulic pressure includes the B-1 control pressure $P_{B1}$.

Further, the B-2 control valve 65, supplied with the signal hydraulic pressure $P_{DSL}$ via the oil passage L-32, regulates the D range pressure $P_D$ supplied via the oil passages L-11 and L-40, a B-2 apply control valve 67 and an oil passage L-70. The control valve 65 generates a B-2 control pressure $P_{B2}$ and supplies the B-2 control pressure $P_{B2}$ to a B-2 apply control valve 67 via the oil passages L-27 and L-41. In this case, the B-1 apply control valve 62, the clutch apply control valve 66 and the B-2 apply control valve 67 are included in a switch valve.

Further, the clutch apply control valve 66 selectively adopts a left half position corresponding to a first switch position, and adopts a right half position corresponding to a second switch position. The clutch apply control valve 66 adopts the left half position due to the C-0 control pressure $P_{C0}$ supplied via the oil passages L-37 and L-38, and supplies the C-0 control pressure $P_{C0}$ supplied via the oil passages L-37 and L-52 to the hydraulic servo C-0 via the oil passage L-53. Further, the clutch apply control valve 66 adopts the left half position due to the C-1 control pressure $P_{C1}$ supplied via the oil passages L-35 and L-81, and supplies the C-1 control pressure $P_{C1}$ supplied via the oil passages L-35 and L-55 to the hydraulic servo C-1 via the oil passage L-57.

The D range pressure $P_D$ corresponding to another hydraulic pressure is supplied to the clutch apply control valve 66 via the oil passage L-11, via the oil passages L-11 and L-61, or via the oil passages L-11, L-40, L-23 and L-26. Further, in the case where the C-0 control pressure $P_{C0}$ or the C-1 control pressure $P_{C1}$ and the signal hydraulic pressure $P_{S4}$ are not supplied to the clutch apply control valve 66, the clutch apply control valve 66 adopts the right half position due to an energizing force of a spring f corresponding to countering means. Because the portion between the oil passages L-11 and L-53 and the portion between the oil passages L-61 and L-57 communicate, the D range pressure $P_D$ is supplied to the hydraulic servos C-1 and C-0, and accordingly the portion between the oil passages L-26 and L-24 is shut off. Further, in the case where the clutch apply control valve 66 adopts the left half position, the portion between the oil passages L-11 and L-53 and the portion between the oil passages L-61 and L-57 are shut off.

Next, the B-1 apply control valve 62 selectively adopts a left half position corresponding to a position at a normal, non-fail state, and adopts a right half position corresponding to a position at a fail state. The B-1 apply control valve 62 supplies and discharges the C-1 control pressure $P_{C1}$ and the C-0 control pressure $P_{C0}$ with respect to the hydraulic servos C-1 and C-0 and supplies and discharges the B-1 control pressure $P_{B1}$ with respect to the hydraulic servo B-1. Further, the B-1 apply control valve 62 adopts the left half position due to a line pressure PL supplied via the oil passages L-1 and L-51 and an oil passages L-54, and receives the B-1 control pressure $P_{B1}$ supplied via the oil passage L-25 at the left half position via an oil passage L-71.

Further, the B-1 apply control valve 62 adopts the right half position due to the C-0 control pressure supplied via the oil passages L-37 and L-62 and the C-1 control pressure $P_{C1}$ supplied via the oil passages L-35 and L-63. In this state, the B-1 apply control valve 62 receives the D range pressure $P_D$ supplied via the oil passages L-11 and L-72 at the right half position via the oil passage L-71 and supplies the D range pressure $P_D$ supplied via the oil passages L-11 and L-73 to the fourth-to-fifth shift valve 61 via the oil passages L-64 and L-65 so as to provide a fail safe pressure (a signal hydraulic pressure) $P_{FS}$. In this case, the fourth-to-fifth shift valve 61 includes the switch valve.

In this case, the B-1 control pressure $P_{B1}$, the C-0 control pressure $P_{C0}$ and the C-1 control pressure $P_{C1}$ are applied to the B-1 apply control valve 62 to move a spool portion upward that is, so that the B-1 apply control valve 62 adopts the right half position. Supplying these three hydraulic pressures, i.e., the B-1 control pressure $P_{B1}$, the C-0 control pressure $P_{C0}$ and the C-1 control pressure $P_{C1}$, allows a total of the hydraulic pressures to become equal to a predetermined pressure or higher, such that the portion between the oil passages L-73 and L-64 communicate with each other. Further, this also provides for the D range pressure $P_D$ to be supplied to the clutch apply control valve 66 via the oil passage L-79 so as to form the fail safe pressure $P_{FS}$.

The fourth-to-fifth shift valve 61 is supplied with the signal hydraulic pressure $P_{S4}$ via the oil passage L-28 and is supplied with the fail safe pressure $P_{FS}$ via the oil passage L-65. The fourth-to-fifth shift valve 61 adopts a left half position corresponding to a position at a normal non-fail state in the first to fourth speeds of the forward movement range and adopts a right half position corresponding to a position at a fail state at a time when the fifth speed and the fail is generated.

In the left half position, the fourth-to-fifth shift valve 61 supplies the line pressure $P_L$ supplied via the oil passages L-1 and L-51 to the B-1 apply control valve 62 via the oil passage L-54, supplies the line pressure $P_L$ to the hydraulic servo B-3 via the oil passage L-98, and supplies the R range pressure $P_R$ supplied via the oil passages L-12 and L-66 to the B-2 control valve 65 via the oil passage L-67, thereby making it possible to travel backward.

At the right half position, the fourth-to-fifth shift valve 61 supplies the D range pressure $P_D$ supplied via the oil passages L-11, L-40 and L-68 to the hydraulic servo C-3 via the oil passage L-99, thus preventing the backward traveling. In this case, the signal hydraulic pressure $P_{S4}$ to the fourth-to-fifth shift valve 61, generated by the fourth solenoid valve S4, is supplied via the oil passage L-18, the solenoid relay valve 56 and the oil passage L-28, placing the spool portion a at the right half position and the plunger b at the left half position. Further, the fail safe pressure $P_{FS}$ to the fourth-to-fifth shift valve 61, generated by the B-1 apply control valve 62, is supplied via the oil passages L-64 and L-65, placing the spool portion a and the plunger b at the right half position.

Next, the B-2 apply control valve 67 is supplied with the D range pressure $P_D$ via the oil passages L-11, L-40, L-23 and L-69 so as to adopt the left half position. The B-2 apply control valve 67 supplies the D range pressure PD supplied via the oil passages L-11, L-40 and L-23 to the B-2 control valve 65 via the oil passage L-70. In this case, the B-2 control pressure $P_{B2}$ is supplied to the B-2 apply control valve 67 via the oil passage L-41, the hydraulic pressure supplied to the hydraulic servo C-0 via the oil passage L-85 is supplied to the B-2 apply control valve 67, and the B-1 control pressure $P_{B1}$ is supplied to the B-2 apply control valve 67 via the oil passages L-25, L-74, L-44 and L fourth-to-fifth, such that the B-2 apply control valve 67 operates to move the spool portion a upward, that is, the B-2 apply control valve 67 adopts the right half position. When the total of the two of these three hydraulic pressures supplied, i.e., the B-2 control pressure $P_{B2}$, the oil pressure supplied to the hydraulic servo C-0 and the B-1 control pressure $P_{B1}$ becomes equal to or higher than a predetermined pressure, the B-2 apply control valve 67 adopts the right half position. This causes the portion between the oil passages L-23 and L-70 to shut off and the oil passage L-70 communicates with a drain port.

In this case, to achieve a certain shifting speed in the automatic transmission 11 having the structure mentioned above, the structure is made such that one or more predetermined frictional engagement elements are engaged. However, when the failure occurs in the solenoid valve, such as the first to third solenoid valves SL1 to SL3 and the like, and the frictional engagement element, which is not required to be engaged, is engaged, there is a risk of generating an interlock in the variable speed gear 13.

For example, the first clutch C1 and the first brake B1 are simultaneously engaged at the second speed in the forward movement range, the first clutch C1 and the fourth clutch C1 are simultaneously engaged at the third speed, and the fourth clutch C0 and the first brake B1 are simultaneously engaged at the fourth speed and the fifth speed. However, when the failure occurs in the solenoid valve, and the first and fourth clutches C1 and C0 (corresponding to two frictional engagement elements) and the first brake B1 (corresponding to another frictional engagement element) are simultaneously engaged, the interlock is generated in the variable speed gear 13.

Then, in order to prevent the first clutch C1, the fourth clutch C0 and the first brake B1 from being simultaneously engaged, the structure is made such that when the C-1 control pressure $P_{C1}$, the C-0 control pressure $P_{C0}$ and the B-1 control pressure $P_{B1}$ are going to be simultaneously supplied to the hydraulic servo C-1, the hydraulic servo C-0 and the hydraulic servo B-1, respectively, the clutch apply control valve 66 shuts off the supply of the C-1 control pressure $P_{C1}$ to the hydraulic servo C-1, the supply of the C-0 control pressure $P_{C0}$ to the hydraulic servo C-0, and the supply of the hydraulic pressure to the B-1 control valve 55.

Accordingly, the B-1 apply control valve 62 includes a spool formed by the spool portion a and the plunger b. The spool portion a has lands a1 to a5. A signal hydraulic chamber e3 is formed by the land a3, a signal hydraulic chamber e4 is formed by the land a4, a signal hydraulic chamber e5 is formed by the land a5, and a signal hydraulic chamber e is formed by the plunger b. Further, the spring f is arranged so as to abut against the land a1. When areas of the lands a1 to a5 are set to Su1 to Su5, the areas Su1 to Su5 have the following relation.

Su1=Su2=Su3>Su4>Su5

Accordingly, normally, the line pressure $P_L$ is supplied to the signal hydraulic chamber e. The line pressure $P_L$ pushes the spool portion a and the plunger b so that the B-1 apply control valve 62 adopts the left half position. The spring f pushes the spool portion a so that the B-1 apply control valve 62 adopts the left half position.

Further, the clutch apply control valve 66 includes a spool portion a having lands a1 to a6. A signal hydraulic chamber e1 is formed by the land a1, a signal hydraulic chamber e2 is formed by the land a2, a signal hydraulic chamber e3 is formed by the land a3, and a signal hydraulic chamber e6 is formed by the land a6. Further, the spring f is arranged so as to abut against the land a6. When areas of the lands a1 to a6 are set to Su1 to Su6, the areas Su1 to Su6 have the following relation.

Su1<Su2<Su3=Su4=Su5=Su6

Further, the fourth-to-fifth shift valve 61 includes a spool formed by a spool portion a and a plunger b. The spool portion a has lands a1 to a4. A signal hydraulic chamber e1 is formed by the land a1, a signal hydraulic chamber e4 is formed by the land a4, and a signal hydraulic chamber e is formed by the plunger b. Further, the spring f is arranged so as to abut against the land a4. At a first speed to a fourth speed in the low shifting speed, at a neutral time and at a reverse movement time, the solenoid of the fourth solenoid valve S4 is turned off. This prevents the signal hydraulic pressure $P_{S4}$ from being supplied to the signal hydraulic chamber e causing the fourth-to-fifth shift valve 61 to adopt the left half position.

At the fifth speed in the high shifting speed, the solenoid of the fourth solenoid valve S4 is turned on. This allows the signal hydraulic pressure $P_{S4}$ to be supplied to the signal hydraulic chamber e1 causing the fourth-to-fifth shift valve 61 to adopt the right half position.

Further, when the fourth-to-fifth shift valve 61 is placed at the left half position, it increases the change gear ratio of the sub transmission 24. However, when fourth-to-fifth shift valve 61 is placed at the right half position, it reduces the change gear ratio of the sub transmission 24.

In this case, when the C-1 control pressure $P_{C1}$ is generated, the C-1 control pressure $P_{C1}$ is supplied to the signal hydraulic chamber e1 of the clutch apply control valve 66 via the oil passages L-35 and L-81, allowing the clutch apply control valve 66 to adopt the left half position. Further, the C-1 control pressure $P_{C1}$ is supplied to the clutch apply control valve 66 via the oil passages L-35 and L-55, and is further supplied to the hydraulic servo C-1 via the oil passage L-57.

When the C-0 control pressure $P_{C0}$ is generated, the C-0 control pressure $P_{C0}$ is supplied to the signal hydraulic chamber e3 of the clutch apply control valve 66 via the oil passages L-37 and L-38, allowing the clutch apply control valve 66 to adopt the left half position. Further, the C-0 control pressure $P_{C0}$ is supplied to the clutch apply control valve 66 via the oil passages L-37 and L-52, and is further supplied to the hydraulic servo C-0 via the oil passage L-53.

In this case, when the C-1 control pressure $P_{C1}$, the C-0 control pressure $P_{C0}$ and the B-1 control pressure $P_{B1}$ are simultaneously generated, the C-1 control pressure $P_{C1}$ and the C-0 control pressure $P_{C0}$ are respectively supplied to the signal hydraulic chambers e4 and e5 of the B-1 apply control valve 62 via the oil passage L-63 and the oil passage L-62. Accompanying this, the spool portion a is pushed by a force corresponding to an area difference between the lands a4 and a5 and a force corresponding to an area of the land a5 so that the B-1 apply control valve 62 adopts the right half position. Further, the B-1 control pressure $P_{B1}$ which is supplied to the B-1 apply control valve 62 via the oil passage L-25, then is temporarily fed to the oil passage L-71, and is again supplied to the signal hydraulic chamber e3 of the B-1 apply control valve 62 via the oil passage L-71, such that the spool portion a is pushed by the force corresponding to an area difference between the lands a3 and a4 so that the B-1 apply control valve 62 adopts the right half position.

At this time, the spool portion a is pushed against the line pressure PL supplied to the signal hydraulic chamber e and the spring load of the spring f. This causes the B-1 apply control valve 62 to adopt the right half position. Furthermore, the B-1 apply control valve 62 detects that a failure has occurred in the solenoid valve or the control valve corresponding to the hydraulic pressure supplying means, allowing the oil passage L-73 and the oil passage L-64 to communicate with each other. Further, a D range pressure $P_D$ is generated in a port P-64 corresponding to the output portion so as to form the fail safe pressure $P_{FS}$ showing that the failure has occurred in the solenoid valve or the control valve, and a fail safe pressure $P_{FS}$ is supplied to the clutch apply control valve 66 via the oil passages L-64 and L-79. The fail safe pressure $P_{FS}$ supplied to the clutch apply control valve 66 then pushes the spool portion a with a force corresponding to the area of the land a6 together with the spring f so that the clutch apply control valve 66 adopts the right half position. As a result, the clutch apply control valve 66 adopts the right half position.

At this time, the oil passage L-26 and the oil passage L-24 are shut off, and the D range pressure $P_D$ is not supplied to the B-1 control valve 55. Accordingly, in the B-1 control valve 55, the B-1 control pressure $P_{B1}$ is not generated, and thus the B-1 control pressure $P_{B1}$ is not supplied to the hydraulic servo B-1.

In this case, a first hydraulic pressure detecting portion, which detects that the C-0 control pressure $P_{C0}$ and the C-1 control pressure $P_{C1}$ are generated, is formed by the signal hydraulic chambers e4 and e5 which are connected to the oil passages L-63 and L-62 in the B-1 apply control valve 62. A second hydraulic pressure detecting portion, which detects that the B-1 control pressure $P_{B1}$ is generated, is formed by the signal hydraulic chamber e3. The first and second hydraulic pressure detecting portions detect the matter that the C-1 control pressure $P_{C1}$, the C-0 control pressure $P_{C0}$ and the B-1 control pressure $P_{B1}$ are simultaneously generated in the hydraulic servos C-1, C-0 and B-1. Further, a hydraulic pressure supply detecting portion, which detects that the C-1 control pressure $P_{C1}$, the C-0 control pressure $P_{C0}$ and the B-1 control pressure $P_{B1}$ are simultaneously supplied to the B-1 apply control valve 62, is formed by the signal hydraulic chamber e6 to which the oil passage L-79 is connected in the clutch apply control valve 66.

In this case, as the B-1 apply control valve 62 adopts the right half position, the oil passage L-25 and the oil passage L-71 are shut off. However, the oil passage L-72 and the oil passage L-71 are open. Therefore, the D range pressure $P_D$ is supplied to the B-1 apply control valve 62 via the oil passage L-71 and pushes the spool portion a with a force corresponding to an area difference between the lands a3 and a4 such that the B-1 apply control valve 62 adopts the right half position. As a result, the B-1 apply control valve 62 is maintained at the right half position.

Further, when the clutch apply control valve 66 adopts the right half position, the oil passage L-55 and the oil passage L-57 are shut off, the oil passage L-52 and the oil passage L-53 are shut off, and the C-1 control pressure $P_{C1}$ and the C-0 control pressure $P_{C0}$ are not respectively supplied to the hydraulic servos C-1 and C-0. However, the D range pressure $P_D$ is supplied to the clutch apply control valve 66 via the oil passage L-40. Further the D range pressure $P_D$ is supplied to the hydraulic servo C-1 via the oil passage L-57, to the clutch apply control valve 66 via the oil passages L-40 and L-61, and to the hydraulic servo C-0 via the oil passage L-53. In the manner mentioned above, it is possible to engage the first clutch C1 and the fourth clutch C0. In this case, an input portion is formed by input ports P-55 and P-52 which are connected to the oil passages L-55 and L-52 in the clutch apply control valve 66. Further, an output portion is formed by output ports P-57 and P-53 which are connected to the oil passages L-57 and L-53.

As mentioned above, because the C-1 control pressure $P_{C1}$, the C-0 control pressure $P_{C0}$ and the B-1 control pressure $P_{B1}$ are not simultaneously supplied to the hydraulic servos C-1, C-0 and B-1, respectively, and the first clutch C1, the fourth clutch C0 and the first brake B1 are not simultaneously engaged, it is possible to prevent the interlock from being generated in the variable speed gear 13.

In this case, the B-1 apply control valve 62, the areas of the lands a1 to a5, and the spring load of the spring f are set so that the B-1 apply control valve 62 adopts the right half position in the case where all of the C-1 control pressure $P_{C1}$, the C-0 control pressure $P_{C0}$ and the B-1 control pressure $P_{B1}$ are supplied to the B-1 apply control valve 62. The B-1 apply control valve 62 adopts the left half position in the case where only two of the C-1 control pressure $P_{C1}$, the C-0 control pressure $P_{C0}$ and the B-1 control pressure $P_{B1}$ are supplied to the B-1 apply control valve 62.

Further, in the case where the fail safe pressure $P_{FS}$ is not supplied via the oil passages L-64 and L-79, in the clutch apply control valve 66, the areas of the lands a1 to a6, and the spring load of the spring f are set so that the clutch apply control valve 66 adopts the left half position at a time when at least one of the C-1 control pressure $P_{C1}$ and the C-0 control pressure $P_{C0}$ is supplied to the clutch apply control valve 66. The clutch apply control valve 66 adopts the right half position in the case where the fail safe pressure $P_{FS}$ is supplied via the oil passages L-64 and L-79.

In this case, in order to achieve a predetermined shifting speed, it is necessary to supply the hydraulic pressure to the hydraulic servo of a predetermined frictional engagement element which is selected in correspondence to the shifting speed. However, when each of the first to third solenoid valves SL1 to SL3, the B-1 control valve 55, the C-1 control valve 57 and the C-0 control valve 64 is placed in a non-supply state in which it is difficult or impossible to supply the hydraulic pressure to each of the hydraulic servos, and the fail occurs, a neutral state is formed in the variable speed gear 13.

For example, in the fourth speed and the fifth speed of the forward movement range, the structure is made such that the fourth clutch C0 and the first brake B1 are engaged. However, when a failure occurs, such as, for example, a valve stick occurs in the C-0 control valve 64, the B-1 control valve 55 or the like, the C-0 control pressure $P_{C0}$ and the B-1 control pressure $P_{B1}$ are not generated. Further, because the C-0 control pressure $P_{C0}$ and the B-1 control pressure $P_{B1}$ are also not supplied to the B-1 apply control valve 62 and the clutch apply control valve 66, it becomes impossible to engage the fourth clutch C0 and the first brake B1. A neutral state is formed in the variable speed gear 13 and it becomes impossible to achieve the fourth speed and the fifth speed.

Then, in accordance with the present embodiment, when the C-0 control pressure $P_{C0}$ is not generated, and the C-0 control pressure $P_{C0}$ is not supplied to the signal hydraulic chamber e3 via the oil passage L-38, the structure in the clutch apply control valve 66 is made such that the spool portion a is pushed by the spring f, and the clutch apply control valve 66 adopts the right half position. Accordingly, the D range pressure $P_D$ corresponding to another hydraulic pressure is supplied to the clutch apply control valve 66 via the oil passage L-40, to the hydraulic servo C-1 via the output port P-57 and the oil passage L-57, to the clutch apply control valve 66 via the oil passages L-40 and L-61, and to the hydraulic servo C-0 via the output port P-53 and the oil passage L-53. As a result, the first clutch C1 and the fourth clutch C0 are engaged in the main transmission 23, the main transmission becomes in the lock-up state so as to reduce the change gear ratio, and the change gear ratio of the variable speed gear 13 is made small. Further, in the variable speed gear 13, the third speed can be achieved as the predetermined transmission speed change in the high speed shift side.

In this case, in the fifth speed of the forward movement range, when the solenoid of the fourth solenoid valve S4 is turned on, the signal hydraulic pressure $P_{S4}$ is supplied to the fourth-to-fifth shift valve 61, and the fourth-to-fifth shift valve 61 adopting the left half position is going to adopt the right half position with leaving the plunger b. In this case, the D range pressure $P_D$ corresponding to another hydraulic pressure supplied to the fourth-to-fifth shift valve 61 via the oil passage L-68 is supplied to the hydraulic servo C-3 via the oil passage L-99. At this time, the first clutch C1 and the fourth clutch C0 are engaged, the third clutch C3 is engaged, the change gear ratios of the main transmission 23 and the sub transmission 24 are made small, the change gear ratio of the variable speed gear 13 is made small, and an approximate fourth speed is achieved as the predetermined change gear ratio in the high speed shift side.

Further, in the case where the B-1 control pressure $P_{B1}$ is not generated, neutral state detection processing means (not shown) in the control unit determines whether or not a difference $\Delta\gamma$ between an actual gear ratio $\gamma$, calculated on the basis of a rotational speed of the input shaft 16 and a rotational speed of the output gear 35, and a theoretical gear ratio $\gamma 0$ of the variable speed gear 13 on the basis of calculation, is within a previously set range. Further, the neutral state detection processing means detects the neutral state in the case where the difference $\Delta\gamma$ is within the range, such that the predetermined shifting speed is achieved by engaging the non-failed frictional engagement element. The neutral state detection processing means detects the neutral state in the case where the difference $\Delta\gamma$ is not within the range.

Further, when the neutral state is detected, solenoid valve drive processing means (not shown) in the control unit sets values of a first solenoid signal $S_{G1}$, a second solenoid signal $S_{G2}$ and a third solenoid signal $S_{G3}$ to 0. The solenoid valve drive processing means also turns each of the solenoids off and generates the C-1 control pressure $P_{C1}$, the C-0 control pressure $P_{C0}$ and the B-1 control pressure $P_{B1}$.

In this case, as mentioned above, the B-1 apply control valve 62 and the clutch apply control valve 66 adopt the right half position, the B-1 control pressure $P_{B1}$ is not generated in the B-1 control valve 55, and the B-1 control pressure $P_{B1}$ is not supplied to the hydraulic servo B-1. Further, in the clutch apply control valve 66, the D range pressure $P_D$ corresponding to another hydraulic pressure is supplied to the hydraulic servos C-1 and C-0. Then, the fourth-to-fifth shift valve 61 is switched due to the application of the fail safe pressure $P_{FS}$ and adopts the right half position. Further, in the fourth-to-fifth shift valve 61, the D range pressure $P_D$ is supplied to the hydraulic servo C-3. As a result, the first clutch C1 and the fourth clutch C0 are engaged in the main transmission 23, the third clutch C3 is engaged in the sub transmission 24, the change gear ratio between the main transmission 23 and the sub transmission 24 is made small, and the change gear ratio of the variable speed gear 13 is made small. Then, in the variable speed gear 13, the approximate fourth speed is achieved as the predetermined shifting speed in the high speed shift side.

As mentioned above, in the case where it is impossible to generate the hydraulic pressure required for achieving the shifting speed among the C-1 control pressure $P_{C1}$, the C-0 control pressure $P_{C0}$ and the B-1 control pressure $P_{B1}$, it is possible to supply the predetermined hydraulic pressure to the hydraulic servo. Further, it is also possible to achieve the shifting speed corresponding to the hydraulic servo to prevent the neutral state from being formed in the variable speed gear 13.

Next, the B-1 apply control valve 62 will be discussed.

Figure 1:
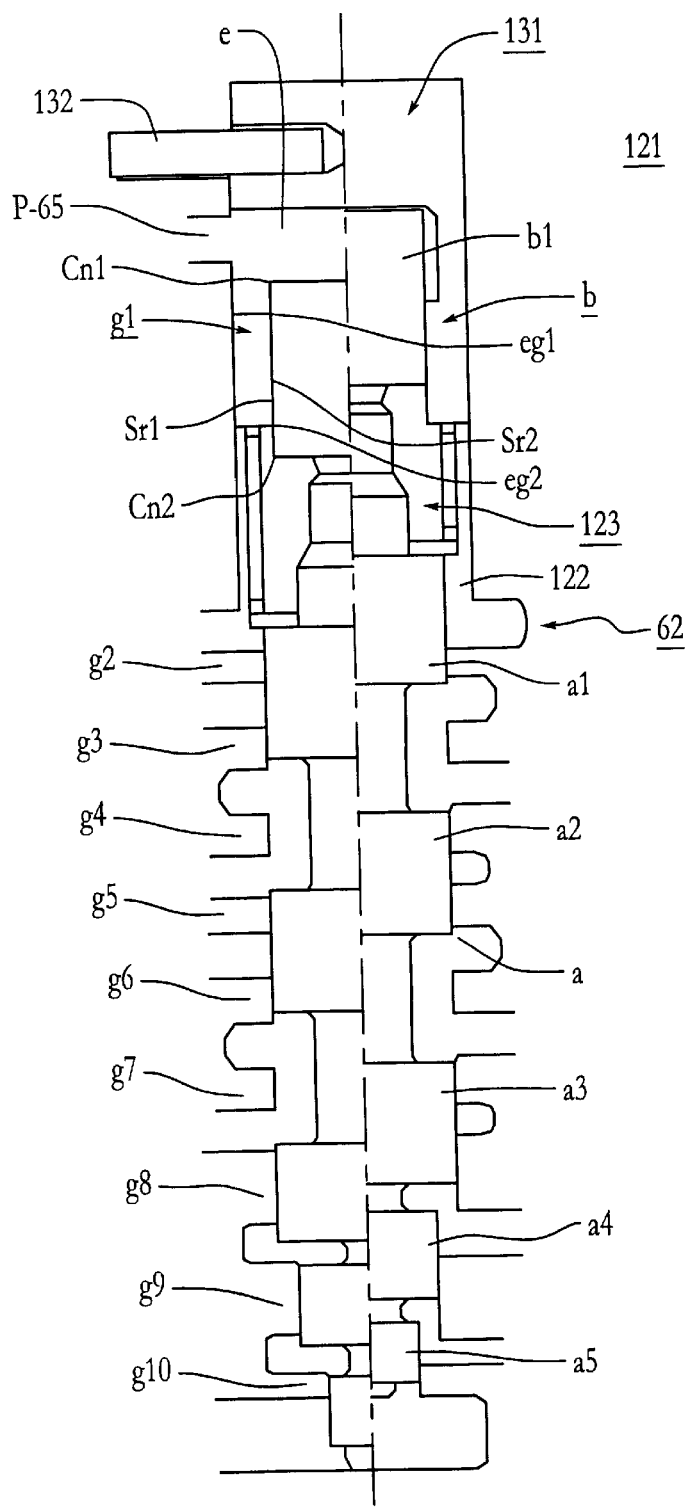
FIG. 1 is a cross sectional view showing a B-1 apply control valve in an exemplary embodiment according to this invention.
Figure 2:
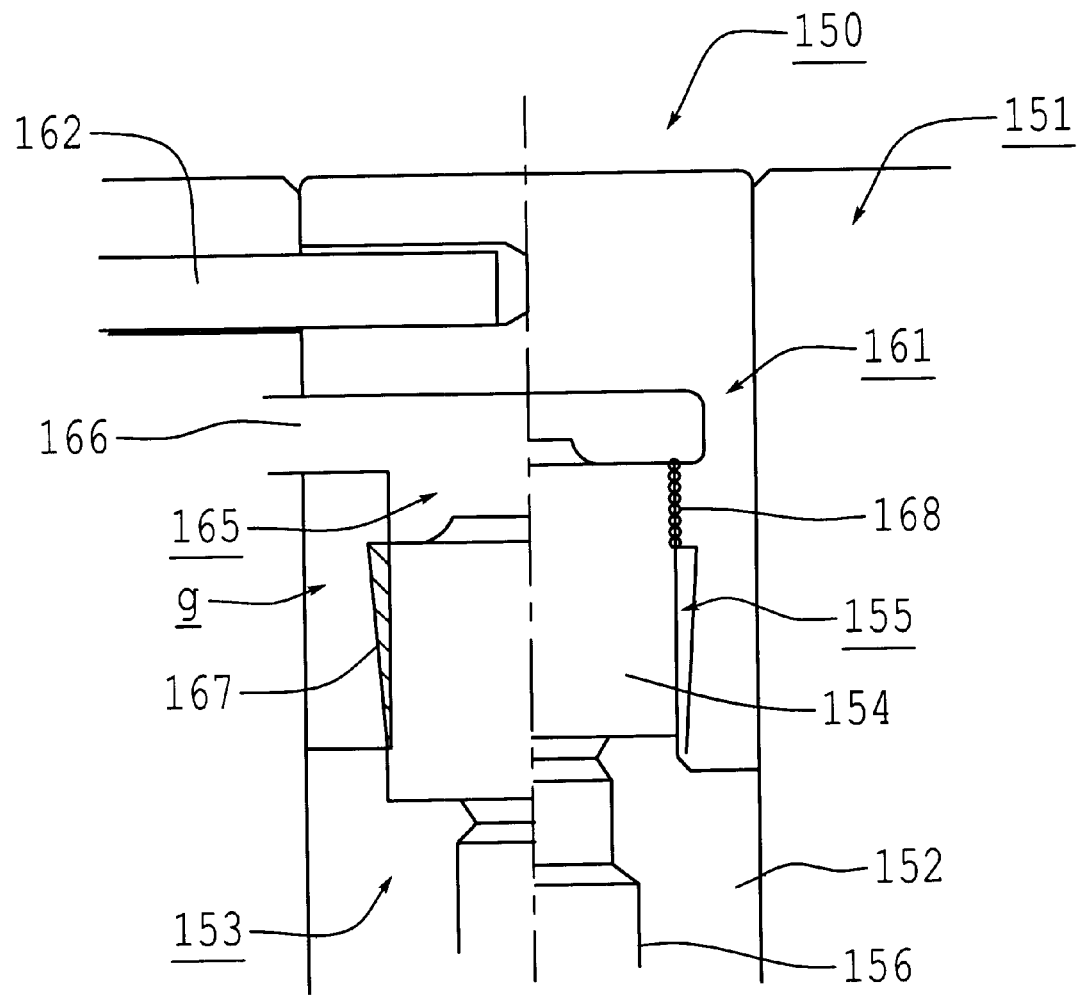
FIG. 2 is a cross sectional view showing a main portion of a conventional switch valve.

FIG. 1 is a cross sectional view showing the B-1 apply control valve in the embodiment according to this invention.

In the drawing, reference numeral 62 denotes a B-1 apply control valve. The B-1 apply control valve 62 adopts the left half position corresponding to the normal position at the normal, non-failure state, and adopts the right half position corresponding to the position at the fail state at a time when the failure is generated. Further, reference numeral 121 denotes a valve body, reference numeral 122 denotes a cylinder chamber formed in the valve body 121, and reference numeral 123 denotes a spool arranged within the cylinder chamber 122 so as to freely move forward and backward. The spool 123 is provided with the spool portion a having a plurality of lands a1 to a5, and the plunger b arranged so as to freely abut against the spool portion a and having the land b1. Further, when the areas of the lands a1 to a5 and b1 are set to Su1 to Su6, the areas Su1 to Su6 have the following relation:

Su1=Su2=Su3>Su4=Su6>Su5

Then, to adjust the difference between the areas Su1 and Su6, the sleeve 131 is fitted within the cylinder chamber 122. The sleeve prevented from coming off by a sleeve retainer 132. Further, a signal oil chamber e1 is formed between the plunger b and the sleeve 131. An input port P-65 is formed in the signal oil chamber e, and the line pressure PL is supplied via the input port P-65.

Further, the plunger b is moved forward and backward along the sleeve 131, to allow an outer peripheral surface Sr1 of the land b1 which, forms a first sliding surface, and an inner peripheral surface Sr2 of the land portion g1 corresponding to the land b1 of the sleeve 131, which forms a second sliding surface to slide. Further, the spool portion a is moved forward and backward along the cylinder chamber 122, to allow outer peripheral surfaces of the lands a1 to a5 and inner peripheral surfaces of land portions g2 to g10 in the cylinder chamber 122 to slide. In this case, a spool surrounding portion is formed by the cylinder chamber 122 and the sleeve 131.

In this case, because there is a risk that a sliding error is generated between the spool 123 and the valve body 121 if each of the axes of the spool 123, the cylinder chamber 122 and the sleeve 131 is shifted, the spool 123 is separated into the spool portion a and the plunger b, as discussed above. Further, the B-1 apply control valve 62 is structured so as to prevent the interlock from being generated in the variable speed gear 13 (shown in FIG. 3). The B-1 apply control valve 62 which is operated only at a time when the failure occurred is placed at the left half position.

Accordingly, when vibration is generated due to the engine drive, the pulsation of the hydraulic pressure generated in the hydraulic circuit or the like is transmitted to the plunger b in the case where the B-1 apply control valve 62 is placed at the left half position. This causes fretting to be generated in the plunger b. At this time, when corner portions Cn1 and Cn2 of the land portion b1 in the plunger b are in contact with the inner peripheral surface Sr2 of the land portion g1, a stepped wear portion is formed.

Accordingly, when the B-1 apply control valve 62 is placed at the left half position, at least one of the corner portions Cn1 and Cn2 protrudes from end portions eg1 and eg2 of the land portion g1. Then, when setting a length of the outer peripheral surface Sr1 in an axial direction, that is, a sliding length to LS1, and setting a sliding length of the inner peripheral surface Sr2 to LS2, the following relation is established:

LS1>LS2.

Accordingly, since the stepped wear portion is not formed on the inner peripheral surface Sr2, the foreign materials such as the wear powders or the like do not enter a portion between the outer peripheral surface Sr1 and the inner peripheral surface Sr2. As a result, it is possible to smoothly move the plunger b without driver discomfort.

Further, because the outer peripheral surface Sr1 and the inner peripheral surface Sr2 are not scratched by the foreign materials, and it is possible to increase durability of the B-1 apply control valve 62.

Next, the B-2 apply control valve 67 will be described in detail.

Figure 8:
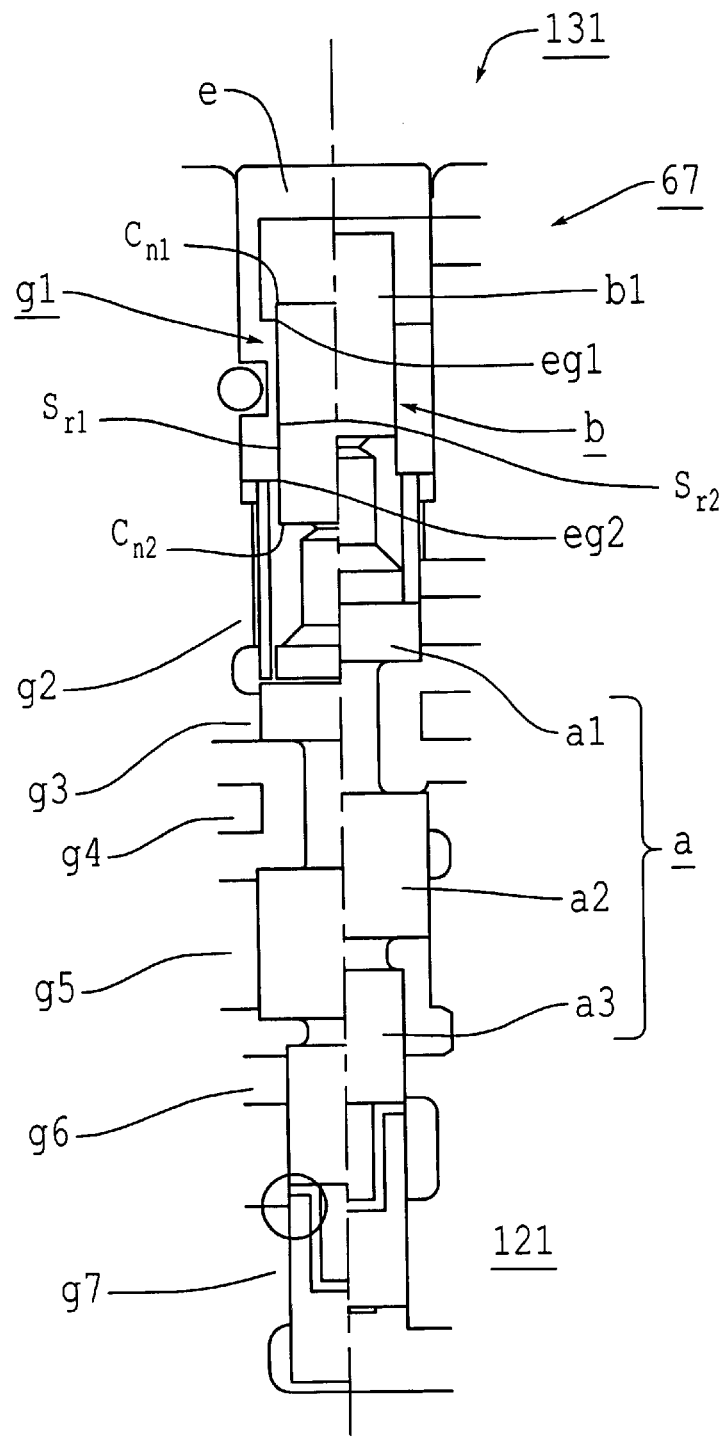
FIG. 8 is a cross sectional view showing a B-2 apply control valve in the embodiment according to this invention.

FIG. 8 is a cross sectional view showing the B-2 apply control valve in the embodiment according to the present invention.

In the drawing, reference numeral 67 denotes a B-2 apply control valve. The B-2 apply control valve 67 adopts the left half position corresponding to the normal position at the normal, non-failure state (except the case where the fifth speed is selected), and adopts the right half position corresponding to the position at the fail state at a time when the failure is generated. Further, reference numeral 121 denotes a valve body, reference numeral 122 denotes a cylinder chamber formed in the valve body 121, and reference numeral 123 denotes a spool arranged within the cylinder chamber 122 so as to freely move forward and backward. The spool 123 is provided with the spool portion a having a plurality of lands a1 to a3, and a plunger b arranged so as to freely abut against the spool portion a and having the land b1. In this case, the spool surrounding portion is formed by the cylinder chamber 122 and the sleeve 131. The signal oil chamber e is formed between the plunger b and the sleeve 131. A fail safe pressure PFS is supplied to the signal oil chamber e.

Further, the plunger b moves forward and backward along the sleeve 131, causing the outer peripheral surface Sr1 of the land b1 forming the first sliding surface, and the inner peripheral surface Sr2 of the land portion g1 corresponding to the land b1 of the sleeve 131 forming the second sliding surface to slide. Further, the spool portion a moves forward and backward along the cylinder chamber 122, causing the outer peripheral surfaces of the lands a1 to a3 and the inner peripheral surfaces of the land portions g2 to g7 in the cylinder chamber 122 to slide.

In this case, the B-2 apply control valve 67 is structured so as to prevent the interlock from being generated in the variable speed gear 13 (shown in FIG. 3). The B-2 apply control valve 67 operates only at a time when the failure occurs and is placed at the left half position.

Accordingly, when vibration is generated due to the engine drive, the pulsation of the hydraulic pressure generated in the hydraulic circuit or the like is transmitted to the plunger b in the case where the B-2 apply control valve 67 is placed at the left half position. This generates fretting in the plunger b. At this time, when the corner portions Cn1 and Cn2 of the land b1 in the plunger b are in contact with the inner peripheral surface Sr2 of the land g1, the stepped wear portion is formed.

Accordingly, when the B-2 apply control valve 67 is placed at the left half position, at least one of the corner portions Cn1 and Cn2 protrudes from the end portions eg1 and eg2 of the land portion g1 in the sleeve 131. Then, when setting the sliding length of the outer peripheral surface Sr1 to LS1, and setting the sliding length of the inner peripheral surface Sr2 to LS2, the following relation is established:

LS1>LS2.

Accordingly, because the stepped wear portion is not formed on the inner peripheral surface Sr2 of the sleeve 131, foreign materials, such as the wear powders or the like, do not enter the portion between the outer peripheral surface Sr1 and the inner peripheral surface Sr2 at a time when the failure occurs. As a result, it is possible to smoothly move the plunger b without driver discomfort.

Further, because the outer peripheral surface Sr1 and the inner peripheral surface Sr2 are not scratched by the foreign materials, and it is possible to increase durability of the B-2 apply control valve 67.

Next, the fourth-to-fifth shift valve 61 will be described.

Figure 9:
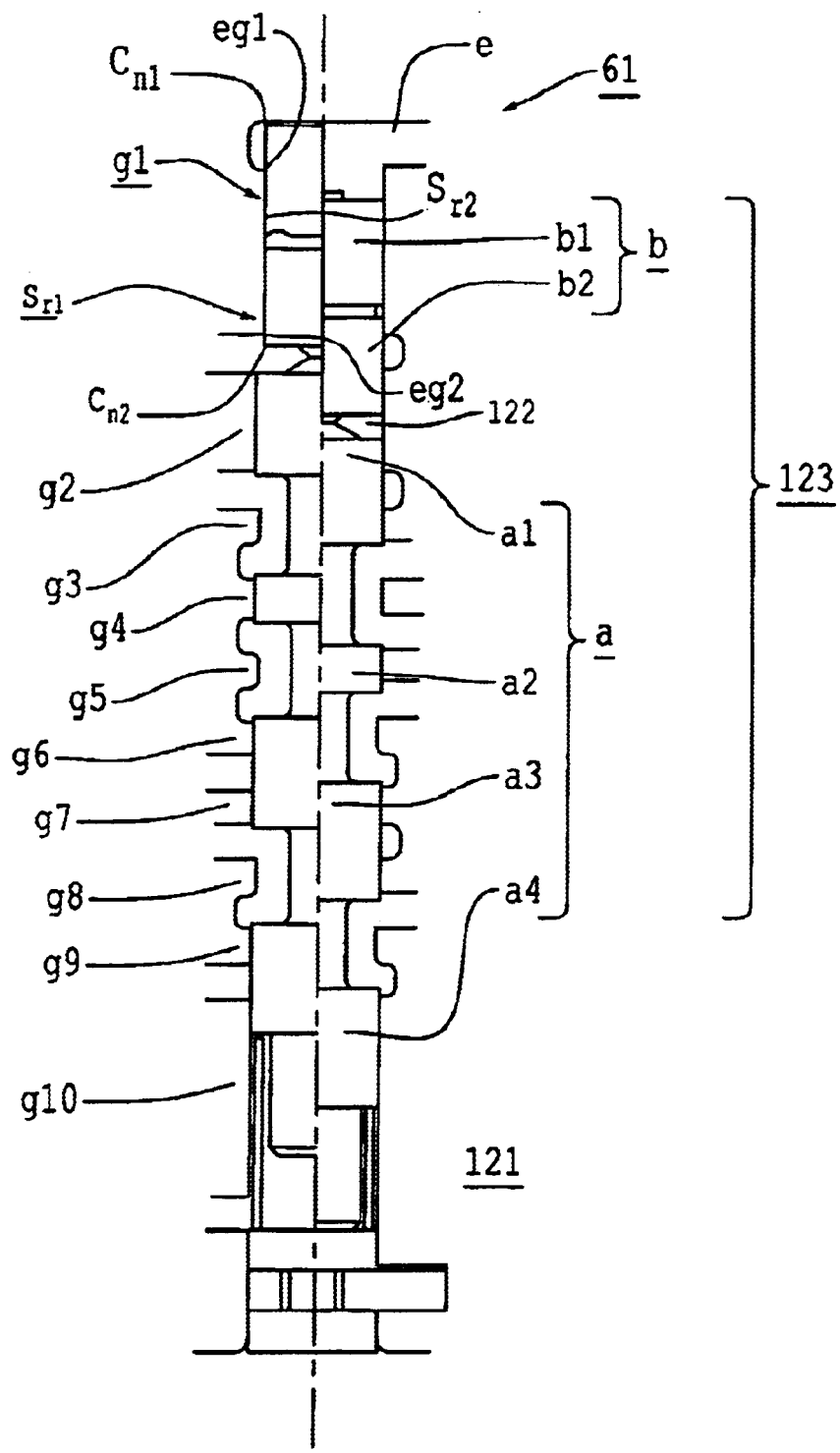
FIG. 9 is a cross sectional view showing a fourth-to-fifth shift valve in the embodiment according to this invention.

FIG. 9 is a cross sectional view explaining the fourth-to-fifth shift valve in this embodiment according to this invention.

In the drawing, reference numeral 61 denotes a fourth-to-fifth shift valve. The fourth-to-fifth shift valve 61 adopts the left half position corresponding to the normal position at the normal state (except the case where the fifth speed is selected), and adopts the right half position corresponding to the position at the fail state at a time when the fail is generated. Further, reference numeral 121 denotes a valve body, reference numeral 122 denotes a cylinder chamber formed in the valve body 121, and reference numeral 123 denotes a spool arranged within the cylinder chamber 122 so as to freely move forward and backward. The spool 123 is provided with the spool portion a having a plurality of lands a1 to a4, and a plunger b arranged so as to freely abut against the spool portion a and having the lands b1 and b2. In this case, the spool surrounding portion is formed by the cylinder chamber 122 and the sleeve 131. Further, the signal oil chamber e is formed between the plunger b and the valve body 121, and the fail safe pressure PFS is supplied to the signal oil chamber e.

Further, the plunger b moves forward and backward along the cylinder chamber 122, causing the outer peripheral surface Sr1 of the lands b1 and b2 forming the first sliding surface, and the inner peripheral surface Sr3 of the land portion g1 corresponding to the lands b1 and b2 of the cylinder chamber 122 constituting the second sliding surface to slide. Further, the spool portion a moves forward and backward along the cylinder chamber 122, causing the outer peripheral surfaces of the lands a1 to a4 and the inner peripheral surfaces of the land portions g2 to g10 in the cylinder chamber 122 to slide.

In this case, because the fourth-to-fifth shift valve 61 is structured so as to execute the fourth-to-fifth shift and achieve a predetermined shifting speed at a time when the failure occurs, the fourth-to-fifth shift valve 61 is not operated at the normal, non-failure state, and is placed at the left half position.

Accordingly, when vibration is generated due to the engine drive, the pulsation of the hydraulic pressure generated in the hydraulic circuit or the like is transmitted to the plunger b in the case where the fourth-to-fifth shift valve 61 is placed at the left half position. This generates fretting in the plunger b. At this time, when the corner portions Cn1 and Cn2 of the lands b1 and b2 in the plunger b are in contact with the inner peripheral surface Sr3, the stepped wear portion is formed.

Accordingly, when the fourth-to-fifth shift valve 61 is placed at the left half position, at least one of the corner portions Cn1 and Cn2 protrudes from the end portions eg1 and eg2 of the land portion g1 in the valve body 121. Then, when setting the sliding length of the outer peripheral surface Sr1 to LS1, and setting the sliding length of the inner peripheral surface Sr2 to LS2, the following relation is established:

LS1>LS2.

Accordingly, because a stepped wear portion is not formed on the inner peripheral surface Sr3, foreign materials, such as the wear powders or the like, do not enter the portion between the outer peripheral surface Sr1 and the inner peripheral surface Sr3 when failure occurs. As a result, it is possible to smoothly move the plunger b without causing driver discomfort.

Further, because the outer peripheral surface Sr1 and the inner peripheral surface Sr3 are not scratched by the foreign materials, and it is possible to increase durability of the fourth-to-fifth shift valve 61.

In this case, this invention is not limited to the embodiment described above, but can be accordingly modified based of this invention, without departing from the scope of the invention.

What is claimed is:

1. A switch valve comprising:
   a spool including
      a spool portion arranged so as to freely move forward and backward and provided with at least one spool portion land, and
      a plunger arranged so as to freely abut against said spool portion and provided with a plunger land; and
   a spool surrounding portion surrounding said spool and provided with a plurality of land portions each one of the land portions respectively corresponding to one of the at least one spool portion land or the plunger land,
   wherein said spool selectively adopts a position at a normal state and a position at a fail state, and in the position at the normal state, each corner portion of the plunger land extends from a respective end portion of the corresponding land portion.

2. A switch valve according to claim 1, wherein said spool surrounding portion is formed by a cylinder chamber formed in a valve body.

3. A switch valve according to claim 2, wherein said spool surrounding portion is formed by said cylinder chamber and a sleeve arranged in said cylinder chamber.

4. A switch valve comprising:
   a spool including
      a spool portion arranged so as to freely move forward and backward and provided with at least one spool portion land, and
      a plunger arranged so as to freely abut against said spool portion and provided with a plurality of plunger lands; and
   a spool surrounding portion surrounding said spool and provided with a plurality of land portions each one of the land portions respectively corresponding to one of the at least one spool portion land or one of the plurality of plunger lands,
   wherein said spool selectively adopts a position at a normal state and a position at a fail state, and in the position at the normal state, each of a proximate corner portion, which is axially proximate from the spool portion, of the plurality of plunger lands and a farthermost corner portion, which is axially farthermost from the spool portion, of the plurality of plunger lands extends from a respective end portion of the corresponding land portion.

5. A switch valve according to claim 4, wherein said spool surrounding portion is formed by a cylinder chamber formed in a valve body.

6. A switch valve according to claim 5, wherein said spool surrounding portion is formed by said cylinder chamber and a sleeve arranged in said cylinder chamber.

7. A switch valve comprising:

a spool including
- a spool portion arranged so as to freely move forward and backward and provided with at least one spool portion land, and
- a plunger arranged so as to freely abut against said spool portion and provided with a plunger land; and a spool surrounding portion surrounding said spool and provided with a plurality of land portions each one of the land portions respectively corresponding to one of the at least one spool portion land or the plunger land, wherein the plunger land at a normal position has each end extending beyond an adjacent sleeve-land-portion end formed in the spool surrounding portion.

8. A switch valve according to claim 7, wherein said spool surrounding portion is formed by a cylinder chamber formed in a valve body.

9. A switch valve according to claim 8, wherein said spool surrounding portion is formed by said cylinder chamber and the sleeve arranged in said cylinder chamber.

* * * * *